E. C. CURTIS.
GANG PLOW.
APPLICATION FILED AUG. 10, 1909.

1,006,440.

Patented Oct. 17, 1911.

3 SHEETS—SHEET 1.

E. C. CURTIS.
GANG PLOW.
APPLICATION FILED AUG. 10, 1909.

1,006,440.

Patented Oct. 17, 1911.
3 SHEETS—SHEET 2.

Witnesses
Lloyd W. Patch
Watts F. Estabrook

Inventor
Elon C. Curtis
by Vernon E. Hodge
his Attorney

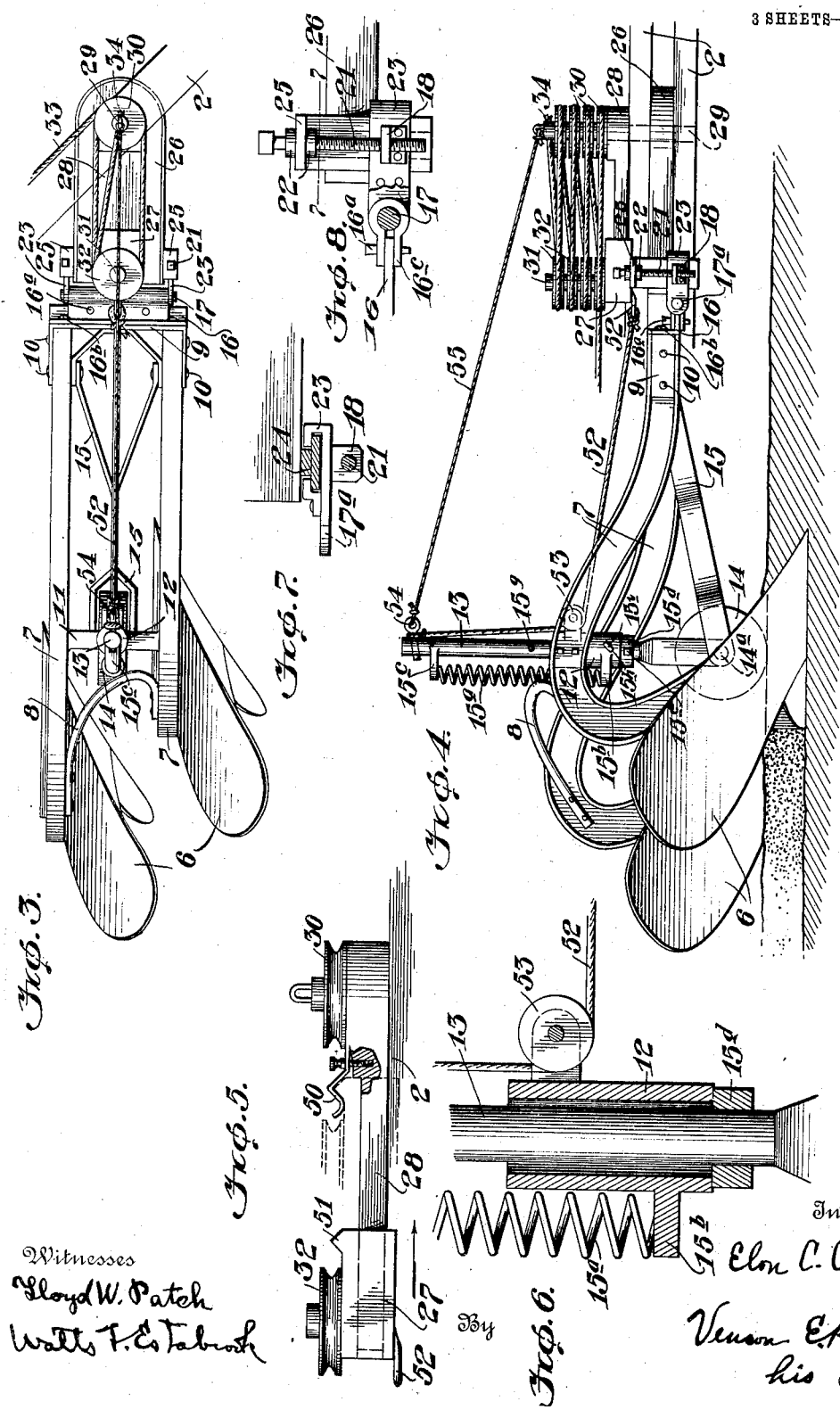

UNITED STATES PATENT OFFICE.

ELON C. CURTIS, OF CROSBY, NORTH DAKOTA, ASSIGNOR OF ONE-FOURTH TO L. A. O. KNOPH, OF CROSBY, NORTH DAKOTA.

GANG-PLOW.

1,006,440.

Specification of Letters Patent.

Patented Oct. 17, 1911.

Application filed August 10, 1909. Serial No. 512,211.

*To all whom it may concern:*

Be it known that I, ELON C. CURTIS, a citizen of the United States, residing at Crosby, in the county of Williams and State of North Dakota, have invented certain new and useful Improvements in Gang-Plows, of which the following is a specification.

My invention relates to an improvement in gang plows, and the primary object is to provide plows adapted especially for attachment to all makes of traction engines.

A further object is to provide means for raising and lowering the plows from a common point; to provide means whereby the plows may be swung to one side or lifted out of the soil momentarily as they strike an obstruction; to provide means for raising and lowering the forward ends of the beams, or adjusting them sidewise as required without the necessity of stopping the machine; to provide means to liberate one or more gangs of plows in case an unpassable obstruction is struck without injury to the remainder of the machine; to provide means for regulating the depth of furrow, and for supporting and carrying the plows entirely upon the gage rollers when occasion requires it; to provide means for adjusting the entire plow laterally with respect to the draft mechanism, and for detaching the plow as occasion may require it from the engine or other draft mechanism.

Furthermore, it is an object of my present invention to provide means for making all of these adjustments while the plow is in motion, and finally it is an object of my invention to provide a plow simple in construction and comprising a minimum number of parts for effectual operation, and requiring a minimum number of hands to operate it, the usual crew required to operate the traction engine being sufficient to control and manipulate my improved plow.

With these several objects in view, my invention consists in certain novel features of construction and combinations of parts which will be hereinafter described and pointed out in the claims.

Figure 1:
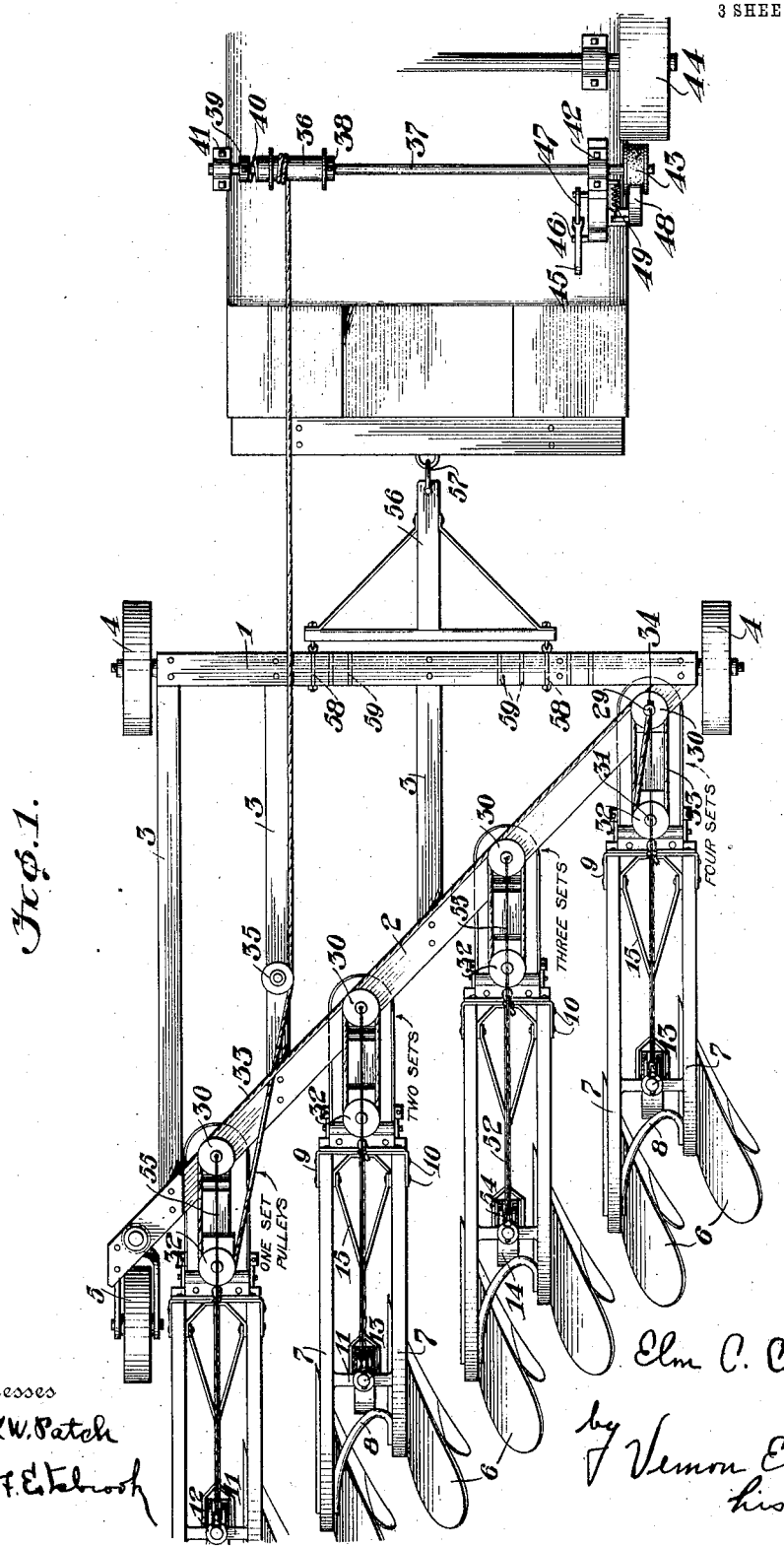
Figure 2:
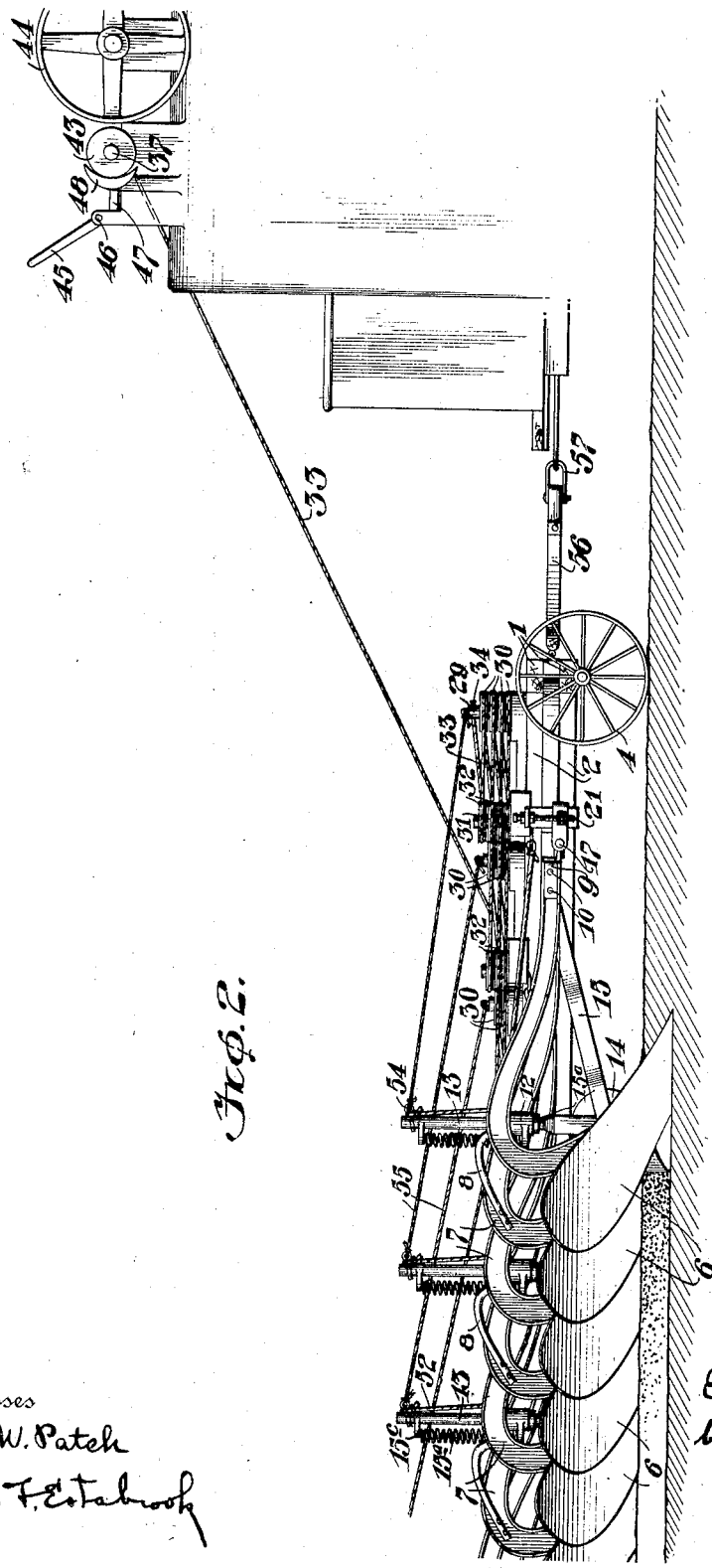

In the accompanying drawings:—Figure 1 is a plan view, Fig. 2 is a side elevation, Fig. 3 is an enlarged detached view in plan of one of the gangs, Fig. 4 is a side elevation of the latter, Fig. 5 is an enlarged detail showing the guide, the slidable head, the locking mechanism, and the block and tackle of the left hand gang, Fig. 6 is an enlarged detail showing the gage wheel shank, sleeve, guiding spring, and a portion of the cable and sheave, Fig. 7 is a section on line 7—7 of Fig. 8, and Fig. 8 is a side view showing one of the vertically adjustable slides and the T-shaped guide upon which it moves, and other connected parts.

The frame of the gang plow is preferably triangular in form, as shown in Fig. 1, and comprises a double axle 1, mounted at the ends in the wheels 4, 4, the double diagonal draft beam 2, 2, connected directly at the right hand end to the corresponding end of the axle, and connected with the axle throughout its length by means of longitudinal bars 3, 3, three of which are illustrated, and the rear end of the diagonally disposed double draft beam 2 is supported by means of a caster wheel 5.

The plows 6, 6, are arranged in gangs of twos, their beams 7, 7, being connected at the rear by means of a brace 8, and at the forward end by means of a strap iron 9, bolted at the sides as at 10, 10. A brace 11 extends across from beam to beam, as shown in Fig. 3, and centrally supports the vertically-disposed sleeve 12, and through this sleeve 12, the shank 13 is loosely and slidably mounted. This shank is bifurcated at its lower end to straddle the gage wheel 14, the latter being mounted on an axle 14ª held in the lower end of the shank, and a brace 15 pivotally connected with the ends of the axle 14ª extends forwardly and is pivoted at its forward end to the rear pin 10, as shown in Fig. 3. A spring 15ª supported on a lug 15ᵇ bears upwardly against a projection 15ᶜ on the shank 13, whereby to normally raise the gage wheel 14 as high as it will go, and permit the plows to cut into the ground a greater or less depth. This depth of furrow is regulated by means of a collar 15ᵈ which is adjustably secured on the shank 13 just below the sleeve 12 by means of the set screw 15ᵉ which collar may be placed at different positions on the shank to suit the requirements. In this connection, it may be mentioned that provision is made for lowering the gage wheels to a point below the plows, thereby raising the plows above the ground when the plow is being transported from place to place, and this may be easily accomplished by lifting the plows, and forcing the shank 13 downwardly until the hole 15ᵍ is brought into registry with the hole 15ʰ, whereupon the pin 15ⁱ is inserted through these holes to hold the parts in the adjustment mentioned, namely to cause the plows to ride upon the gage wheel 14. The plows are hinged in gangs of twos at their forward ends by means of horizontally disposed pins 17, which latter are connected by straps 16ᶜ to the angle-iron 16, by means of the wooden break-pins 16ᵃ, and the angle-iron 16 is secured to the strap plate 9 by means of bolts or rivets 16ᵇ. The hinge-pin 17 protrudes at its ends through orifices 17ᵃ in the shanks of the adjustable slides 23. There are two of these adjustable slides 23 for each gang of plows, and they are constructed and adapted to embrace the vertically-disposed T-shaped guides 24, see Figs. 7 and 8. The adjustment of these slides is effected through the medium of screws 21, 21, the threaded portions of which register with and turn in threaded orifices in the ears 18, 18, which project outwardly from the slides 23, 23, the screws being swiveled at their upper ends in orifices through the flange 25 at the upper ends of the guides 24, collars 22, 22, being secured on the screws above and below the flange 25. These T-shaped guides 24, 24, are secured on opposite sides of the draw-bar 26. The draw-bar 26, and the guide plate 28 are pivotally connected with the two-part diagonally disposed draft bar 2, as shown in Fig. 4, by means of the king bolt 29, and in this way, provision is made for the plows to swing laterally as an obstruction is met. The cross-head 27 has a loose slidable connection with the outer end of the guide-plate 28, and is adapted to move toward the forward end of the plate and back to its normal position, thereby to raise and lower the plow.

On the upper end of the right hand king bolt 29, four sheaves 30, 30, are mounted, and a corresponding number 32 are mounted on stud 31 carried on the right hand cross-head 27. In other words, there are four sets of sheaves for the right hand gang, and these sheaves decrease by one toward the left, that is the second gang has three sets of sheaves, the third, two sets, and the fourth, one set, the purpose of which is readily understood. A cable 33 is secured at 34, thence it passes back and forth around the pulleys or sheaves 30, 32, first around the set to the right, thence to the next set, to the left in the same manner, and thence to the next two sets successively, whereupon the cable is guided around the idle-roller 35, and extends to the drum 36 which latter is loosely mounted on shaft 37 of the engine, the drum being held between collar 38 fixed on the shaft, and the collar 39 adjustably secured on the shaft, between which collar and the head of the drum, a spring 40 is compressed, whereby to frictionally secure the drum 36 upon the shaft, so that in case of excessive strain, the drum would turn without turning the shaft. The shaft is journaled in boxes 41 and 42; the box 42 is slidable, and for the following reason. The shaft 37 carries a friction wheel 43 on the end adjacent to the movable bar 42 in position to be thrown against the drive pulley 44 when it is desired to impart rotary motion to the shaft 37 to wind the cable, lower the gage wheels and raise the plows out of the ground. This is done by means of the hand lever 45 which is fulcrumed at 46, and connected by link 47 to the bearing box. By moving this hand lever in one direction, the friction wheel 43 is thrown into frictional engagement with drive pulley 44, and upon the release of the lever, it is thrown back, and the friction wheel 43 is pressed against the brake 48 by means of a strong spring 49, whereby the shaft and drum are held against a backward turn, thus supporting the plows in their elevated position.

The action which takes place when the cable is wound on the drum is to move the cross-heads 27 successively forward toward the king bolts, the right hand one first, then the next, and so on through the sets of gangs; and all but the right hand set are provided with a spring catch 50, as shown in Fig. 5, which receives and holds the projection 51 on the cross-head 27. As these cross-heads are drawn forward, they pull on the chain or other flexible connection 52 around the pulleys 53, and by their engagement with the spring cotter-pins 54, they force the shanks 13 and the gage wheels 14 downwardly, thus elevating the plows. As the greater number of pulleys in a block and tackle lessen the power required to produce movement, it insures the lifting of the right hand gang first, and the others successively in the order of their arrangement, and the catches 50 on all of the other gangs are of sufficient tension to hold them until the right hand gang is lowered, when the plows are to be put in action, the object of which arrangement is to avoid leaving a triangular space at the end of a furrow unplowed.

Returning to the spring cotter-pins 54, they are retained in the upper ends of the shanks 13, 13, by friction, and as all the strain is downward, they are sufficiently tight so that the parts operate successfully. A short chain or other flexible connection 55, extends more or less directly from each cotter pin to the corresponding king-bolt 29, as shown in Fig. 4. The object of this construction, and of the wooden break-pins 16ᵃ, 16ᵃ, is to permit a gang or gangs of plows to break loose under an abnormal strain, such as striking a stump or an immovable stone, by breaking the pins 16ᵃ, and pulling out the cotter-pin, which latter disconnects the chain or flexible connection 52 from the shank 13, and thus detaches the gang or gangs from the frame without injury to other parts. This I regard as an important feature of the invention.

Mention should be made of the fact that the axle is detachably and adjustably connected with the traction engine by means of a short tongue 56, it being attached to the engine by means of an ordinary clevis 57, which admits of its being detached at any time, as for instance, when it is desirable to haul the plow upon a wagon, or by a team in moving it from place to place. Another advantage is that in soft ground where it may be impossible to pass through with the traction engine, the plow might be detached, and the engine run around the place, and after reaching the other side, the plow could be drawn along at the end of a rope or chain, thus plowing through the soft or wet ground which is an advantage over other gang plows operated by traction engines, where the attachment is more or less permanent, and it is necessary to skip ground of this character. The tongue is also adjustable laterally by means of the bolts 58, 58, passing through holes 59, 59. If, for instance, one of the gangs was removed, for any reason, it would be necessary to shift the tongue to one side to bring the draft at a central point. It should also be mentioned that a crew, consisting of engineer and fireman, for running the traction engine, is sufficient to also operate my improved plow. The adjustments, namely the raising and lowering of the plows bodily, or the vertical or sidewise adjustment of the plow beams to compensate for any bend or twist which may take place in the plow beam due to hitting an obstruction, may all be accomplished without stopping the machine.

In operation, very briefly reviewing what has already been said, when the plows are to be lifted out of the ground, the lever 45 is grasped and by shifting the friction wheel 43 into engagement with the drive pulley 44, the cable 33 is wound on the drum 36, and the right hand gang is first lifted, and then the others successively toward the left, the other three being held by means of a latch 50 so that in lowering the plows by reversing the action, and bringing the wheels 43 to an intermediate point between the drive pulley 44 and the brake 48, the plows are lowered in the same order in which they are lifted. The forward ends of the beams for each gang are individually adjusted by means of the screws 21, they being turned to raise or lower the beams to regulate the inclination of the plow and the depth of furrow, or one screw may be turned more than the other to adjust the beam sidewise to compensate for a bend or twist, and to regulate the position of the plow itself, the collars 15$^d$ are set at the required point on the shanks 13, and when not otherwise resisted, the tension of the spring 15$^a$ is sufficient to raise the shanks 13 until stopped by the collars 15$^d$.

More or less slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. A plow comprising a frame, gangs connected therewith, graduated sets of sheaves for each gang, a cable successively connected with the several sheaves of the different gangs and means for applying tension to the cable whereby the gangs are successively raised or lowered by means of the one cable.

2. In a gang plow, the combination of a frame, a draw-bar and guide-plate pivotally connected with the frame, a cross-head slidably connected with the guide-plate, a vertically disposed guide connected with the draw-bar, a slide adjustable vertically on said vertical guide, and a plow gang connected with said slide and connected to said cross-head.

3. In a gang plow, the combination of a frame, a draw-bar and guide-plate pivotally connected with the frame, a cross-head slidably connected with the guide-plate, a vertically disposed guide connected with the draw-bar, a slide adjustable vertically on said vertical guide, and a plow gang hinged to said slide and connected to said cross-head.

4. In a gang plow, the combination of a frame, a draw-bar and guide-plate pivotally connected with the frame, a cross-head slidably connected with the guide-plate, a vertically disposed guide connected with the draw-bar, a slide adjustable vertically on said vertical guide, a plow gang hinged to said slide and connected to said cross-head, and means for raising and lowering the several gangs of plows on their hinges from a common point.

5. In a gang plow, the combination with a frame, of a slidable cross-head thereon, plow gangs hinged to the frame, a sleeve connected with each gang, a gage wheel, the shank of which has sliding connection in the sleeve, a spring cotter pin frictionally held in the shank, a flexible connection extending from the pin to the frame, and from the pin to the slidable cross-head, and brake pins connecting the plow gangs to the frame, whereby when the plows strike an obstruction sufficient to break the pins, the cotter pins will be withdrawn and the plow gangs released.

6. In a gang plow, the combination with a frame, draw-bars and guide-plates pivotally connected therewith, king bolts for pivotally connecting these parts to the frame of the plow, cross-heads slidably connected with each guide plate and carrying a stud, the beams of the plows having hinged adjustable connection with said draw-bars, pulleys journaled on the studs and king bolts, said pulleys decreasing in number from the right to the left, a cable extending first around the two pulleys at the left, thence the four pulleys connected with the gang next to the right, thence around the six pulleys connected with the next gang, and finally around the eight pulleys connected with the right hand gang where it is fastened, and means for applying draft to the cable whereby the gangs are successively raised or lowered.

In testimony whereof I affix my signature, in the presence of two witnesses.

ELON C. CURTIS.

Witnesses:
C. A. NEALE,
VERNON E. HODGES.

Copies of this patent may be obtained for five cents each, by addressing the "Commissioner of Patents, Washington, D. C."